United States Patent
Schmidt et al.

(10) Patent No.: US 8,480,331 B2
(45) Date of Patent: Jul. 9, 2013

(54) ROAD MAKING MACHINE WITH A MATERIAL DEFLECTOR

(75) Inventors: Thomas Schmidt, Plankstadt (DE); Martin Seibel, Heidelsheim (DE)

(73) Assignee: Joseph Vögele AG, Ludwigshafen/Rhein (DE)

( * ) Notice: Subject to any disclaimer, the term of this patent is extended or adjusted under 35 U.S.C. 154(b) by 0 days.

(21) Appl. No.: 13/359,839

(22) Filed: Jan. 27, 2012

(65) Prior Publication Data

US 2012/0213585 A1 Aug. 23, 2012

(51) Int. Cl.
 *E01C 23/00* (2006.01)
 *B60R 19/54* (2006.01)
(52) U.S. Cl.
 CPC .................................... *B60R 19/54* (2013.01)
 USPC ........................................ 404/84.05; 404/83
(58) Field of Classification Search
 CPC ....................................................... B60R 19/54
 USPC .................. 404/83–84.1; 172/833; 280/727, 280/762
 See application file for complete search history.

(56) References Cited

U.S. PATENT DOCUMENTS

| 2,080,888 | A | * | 5/1937 | Hintz ............................. 172/833 |
| 2,623,310 | A | * | 12/1952 | Raught .......................... 172/833 |
| 3,732,024 | A | * | 5/1973 | Gendrich ....................... 404/118 |
| 4,026,658 | A | | 5/1977 | Neuendorf et al. |
| 5,000,650 | A | | 3/1991 | Brewer et al. |
| 5,974,773 | A | * | 11/1999 | Rieck et al. ...................... 56/314 |

FOREIGN PATENT DOCUMENTS

DE 29915875 U1 2/2000
EP 1083263 A1 3/2001

OTHER PUBLICATIONS

European Search Report dated Aug. 2, 2011, which issued in corresponding EP Application No. 11001515.3.

* cited by examiner

*Primary Examiner* — Raymond W Addie
(74) *Attorney, Agent, or Firm* — Fish & Richardson P.C.

(57) ABSTRACT

The invention relates to a road making machine with a running gear and at least one material deflector which is arranged in front of the running gear in the driving direction and which can be pivoted up and lowered. The road making machine includes a control system by means of which an operator can choose at least between a laying operating mode and a transport operating mode. The control system is adapted to automatically completely pivot the material deflector up in the transport operating mode, and to let the operator adjust the pivot position of the material deflector manually in the laying operating mode.

15 Claims, 3 Drawing Sheets

Figure 1:
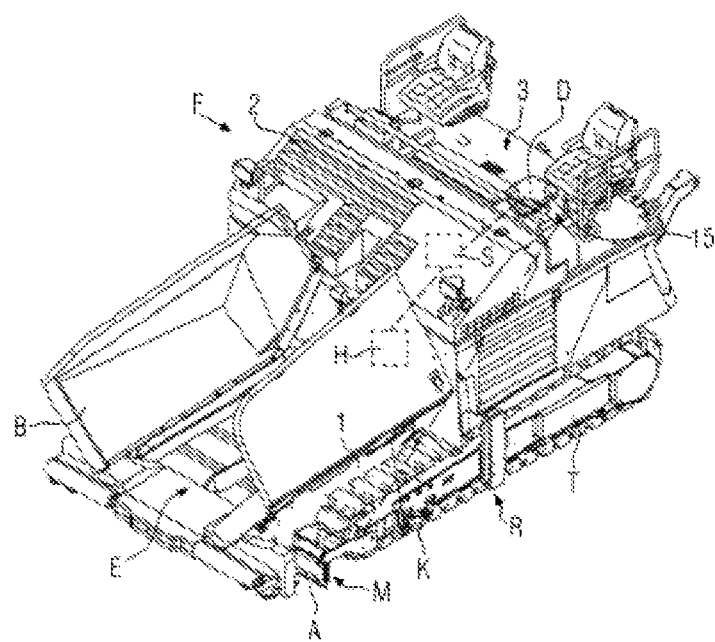

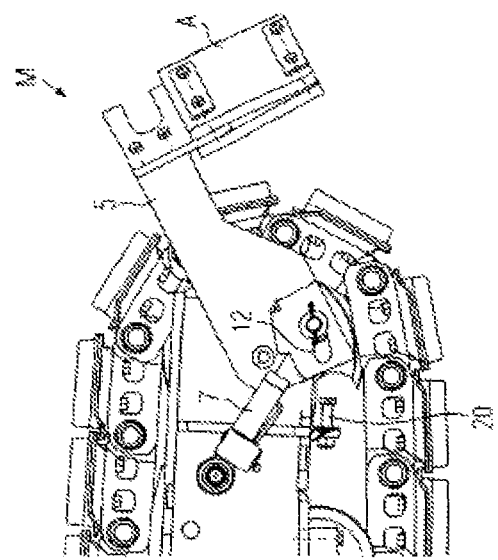
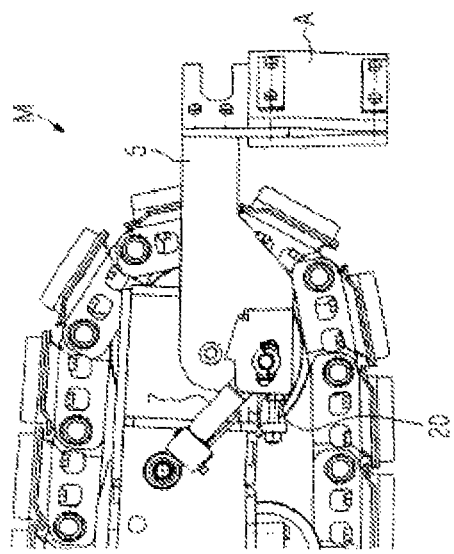

ROAD MAKING MACHINE WITH A MATERIAL DEFLECTOR

The invention relates to a road making machine with a running gear and at least one material deflector in front of the running gear in the driving direction and which can be pivoted up and lowered, and including a control system that enables an operator can to select between at least the laying and transport operating modes and to a method of operating such a road making machine.

It is already known from practice to provide material deflectors in front of the tracklaying gear or the front wheels of a road finishing machine or of a feeder to remove laying material in front of the running gear that has fallen forward out of the material bunker of the respective road making machine to the front of the machine. It is the object to remove irregularities on the foundation course on which a road surface is to be prepared, since such irregularities have a negative effect on the quality of the prepared road surface. During transport drive, where the road making machine is moving from one point to the other outside a laying operation, or while the road making machine is driving onto a low bed truck, the material deflectors are manually folded upwards and mechanically locked in this completely raised position. They thereby permit a greater loading angle of the road making machine, and prevent damage to the material deflector by it getting stuck at obstacles. However, it is very cumbersome and time-consuming to manually fold up the material deflector. Such a conventional material deflector can be seen in U.S. Pat. No. 3,732,024 A.

During the laying operation, too, the material deflector must be temporarily folded up to be able, for example, to drive over obstacles, such as manhole covers. Here, the accessibility of the material deflector is sometimes very bad as the walls of the material bunker of the road making machine which are situated immediately above the material deflector might be folded down.

A material deflector for a road making machine which is described in DE 299 15 875 U1 and in the parallel EP 1 083 263 A1, respectively, offers an improvement. This document already identifies the problem that material scrapers can disturb during the loading of a road finishing machine onto a low bed truck, or that they can leave undesired traces in the road surface at obstacles. Therefore, DE 299 15 875 U1 suggests to retain the material deflector such that it is only limited in its travel downwards, that means that it has free travel to the top.

It is the object of the present invention to further improve a road making machine with a material deflector in particular in view of an even easier handling for an operator.

This object is achieved by a road making machine having the features of claim a running gear and at least one material deflector in front of the running gear in the driving direction and which can be pivoted up and lowered, and including a control system that enables an operator to select between at least the laying and transport operating modes and by a method of operating a road making machine having the features of claim 10, respectively. Advantageous further developments of the invention are stated in the sub-claims.

According to the invention the road making machine comprises a control system by means of which an operator can choose between different operating modes, including at least the laying and transport operating modes. In the operating mode laying, the road making machine is adapted to contribute to the laying of a road surface. In the transport operating mode, the road making machine can be moved from one point to another without any laying operation taking place simultaneously.

The control system in the road making machine according to the invention is now adapted to automatically completely pivot up the material deflector in the transport operating mode. In contrast, in the laying operating mode, the control system is adapted to let the operator manually adjust a pivot position of the material deflector.

The advantage of the road making machine according to the invention is that the operator almost does not have to take care of the material deflector anymore. It is sufficient for the operator to choose between the laying and transport. operating modes The control system will then automatically take care of the optimal orientation of the material deflector without the operator having to separately actuate, not to speak of manually fold up, the material deflector. In this manner, the handling of the material deflector is substantially improved, and damages to the road making machine or to other transport vehicles, such as low bed trucks, can be avoided. For in the road making machine according to the invention, it can no longer happen that an operator of this road making machine forgets to bring the material deflector into its folded up position during a transport drive or during the loading of the road making machine.

Further facilitation can be achieved by a pivot position to be assumed by the material deflector in the laying operating mode (which is optionally variable) being stored in the control system. If the operator selects or activates the operating mode laying, the material deflector is automatically brought into this stored pivot position. From this position, it can be further pivoted manually. The operator can store a new standard pivot position in the control system for the operating mode laying.

Preferably, the material deflector can be pivoted up with respect to the horizontal by an angle of up to 30°, preferably up to 35°. This permits both an advantageous loading angle of the road making machine, for example onto a low bed truck, and a safe removal of the material deflector in case of obstacles in front of the road making machine.

The automatic adjustment of the material deflector into its different pivot positions can be realized by means of a hydraulic system. Usually, hydraulic circuits are anyway already provided on road making machines, for example for adjusting material bunker walls or screeds, so that the provision of another hydraulic system for the material deflector does not involve any substantial additional efforts. It would also be conceivable to integrate the hydraulic system for the material deflector into an already existing hydraulic system.

Particular benefits show when the material deflector is retained, when it is not completely pivoted up, with a free travel permitting it to pivot upward. This free travel allows the material deflector to move upwards itself when driving over obstacles in front of the road making machine. This prevents the material deflector from getting stuck to such obstacles, for example manhole covers, which could block the movement of the entire road making machine. After an obstacle has been traversed, the material deflector can adjust to the previously determined pivot position by its own weight.

To permit such free travel, a point of application of a hydraulic cylinder at the material deflector is preferably retained in an oblong hole. The arrangement of such an oblong hole directly at the point of application of the hydraulic cylinder permits free travel for the material deflector in a constructively simple manner.

In addition or as an alternative, it is possible for a hydraulic cylinder that pivots the material deflector to assume a floating position to retain the material deflector with free travel. The floating position of the hydraulic cylinder could even be adjustable to adjust the angle over which the material deflector can adjust with free travel.

In the position where it is completely pivoted up, the material deflector should be secured so that it cannot be unintentionally pivoted downwards. This can be done by retaining the material deflector with a check valve located in the hydraulic system, by a latch and/or by a mechanical toggle when the deflector s completely pivoted up.

The road making machine can include a special operational control, for example a key button. On actuation of the control in the laying operating mode, the control system automatically causes the material deflector to pivot up into its completely raised position. This special operational control can be actuated by the operator of the road making machine when he identifies an obstacle or any other situation requiring the operator to quickly or temporarily pivot the material deflector into the up position.

The road making machine can be in particular a road finishing machine, a feeder for a road finishing machine, or an excavator. As an alternative, however, other construction machines, for example track-laying machines, could comprise a material deflector and be configured according to the invention.

The invention also relates to a method for the operation of a road making machine wherein an operator chooses, by means of a control system of the road making machine, at least between the operating modes, wherein the material deflector is automatically pivoted up to its highest pivot position in the transport operating mode, and wherein the operator manually adjusts a pivot position of the material deflector in the laying operating mode.

Figure 2:
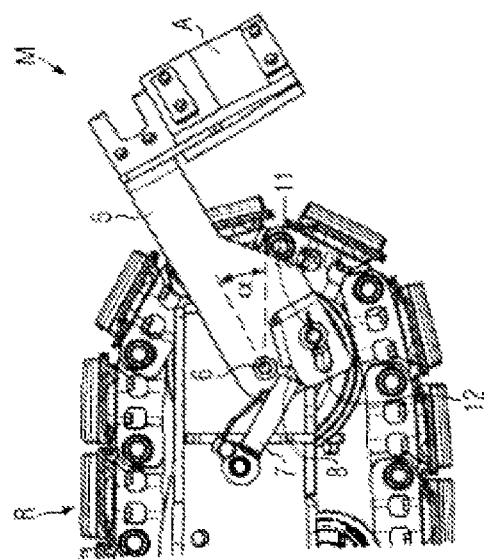
Figure 3:
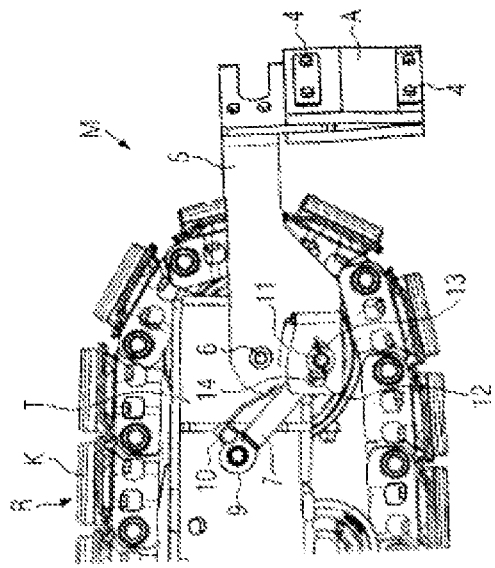

Below, an advantageous embodiment of the invention will be illustrated more in detail with reference to a drawing. In detail:

FIG. 1 shows a road making machine according to the invention, in particular a road finishing machine, FIG. 2 shows the material deflector of a road making machine according to the invention in a lower pivot position, FIG. 3 shows the material deflector shown in FIG. 2 in its completely raised position, FIG. 4 shows a second embodiment of a material deflector according to the invention, and FIG. 5 shows the material deflector shown in FIG. 4 in its completely raised position.

Equal components are always provided with equal reference numerals in the figures.

FIG. 1 shows a road finishing machine F as an example of a road making machine according to the invention. The road making machine F can alternatively be an excavator or a feeder. This road finishing machine F has a chassis 1 with a running gear R, in the shown case a tracklaying gear. At the front end on the chassis 1, seen in the working drive direction, a material bunker B for laying material is provided which is filled from a filling side E. On the chassis 1, there is a primary drive source 2, for example a diesel engine, and behind this drive source 2, there is a driver stand 3.

At both longitudinal sides of the chassis 1 in one running gear half each, the tracklaying gear R comprises a longitudinally placed support T which can be supported at the chassis 1 to be movable vertically or in a swinging manner. The support T carries a caterpillar track K on chain wheels. At each support T, a material deflector M is arranged in front of its caterpillar track K in the working drive direction. The material deflector M serves to displace material lying on the foundation course in front of the road finishing machine F and in particular to keep it away from the running gear R. To this end, the material deflector can have a deflecting surface A inclined with respect to the working drive direction by means of which it displaces the material lying on the foundation course to the inside between the caterpillar tracks K to thus keep the track of the caterpillar tracks K clear.

The road making machine F according to the invention comprises a control system S. By means of an operating device D on the driver stand 3, an operator of the road making machine F can choose between various operating modes, in particular between the operating modes transport and laying. The operator will choose the laying operating mode when the road making machine is to actively take part in a road making process, for example by applying the road surface onto the foundation course or by transporting laying material to a following road finishing machine. The control system S is preferably adapted to put certain working units, such as transport devices, conveyor devices or a screed, into an active operating state, when the laying operating mode was chosen. The operator will in contrast choose the operating mode transport when the road making machine F is only to be displaced without a road surface being laid.

The road finishing machine F according to FIG. 1 moreover has a hydraulic system H. This schematically represented hydraulic system H is controlled by the control system S. The hydraulic system is used, among other things, to pivot the material deflector M.

FIG. 2 shows a side view of a material deflector M according to the invention which is located in front of the running gear R of a road making machine F and mounted on chassis 1. The material deflector M is arranged such that its deflecting surface A is located in the working drive direction in front of the front end of the running gear R of the road making machine F. The running gear R does not have to be a tracklaying gear, it can just as well be a wheel gear.

The deflecting surface A is inclined with respect to the working drive direction of the running gear R. Via fastening means 4, for example screws, the deflecting surface A is releasably and optionally adjustably fixed to a boom 5. This boom can be pivoted about a horizontal swiveling axis 6. This swiveling axis 6 is located at the support T of the running gear R.

A hydraulic cylinder 7 is provided between the support T of the running gear R and the boom 5. The hydraulic cylinder 7 can be supplied with pressurized fluid via the hydraulic system H to retract or extend a piston 8 and thus change the length of the hydraulic cylinder 7. The left end of the hydraulic cylinder in FIG. 2 is fixed to a support element 9, which in turn is fixed to the support T of the running gear R via a swivel bearing 10 so as to be pivoting. The outer end of the piston 8 opposed to the support element 9 (see FIG. 3) represents the point of application 11 of the hydraulic cylinder 7. This point of application 11, which can comprise, for example, a pin arranged in the horizontal direction, is arranged in an oblong hole 12 in the boom 5.

FIG. 2 shows the material deflector M in a lowered position in which the boom 5 extends in an approximately horizontal direction, i.e. the material deflector (or scraper) M rests on the foundation course or at a stop screw. The hydraulic cylinder 7 is in its retracted position. The point of application 11 of the hydraulic cylinder 7 is located in the center of the oblong hole 12 in the boom 5. The interaction between the oblong hole 12 and the point of application 11 of the hydraulic cylinder 7 permits free upward and downward travel for the material deflector M. Without adjusting the hydraulic cylinder 7, the material deflector M can pivot downwards about a pivot angle until the point of application 11 of the hydraulic cylinder 7 reaches the right end 13 of the oblong hole 12 or a stop screw, or it can pivot upwards until the point of application 11 of the hydraulic cylinder 7 reaches the left end 14 of the oblong hole 12. The material deflector M can perform such a passive temporary pivoting movement when encountering an obstacle in front of the road making machine F. Free travel can also be permitted by the hydraulic cylinder 7 taking a floating position.

FIG. 3 shows the material deflector M in its completely raised position. With respect to the horizontal, the material deflector has been pivoted upwards about an angle α of about 27° by the hydraulic system H having supplied the hydraulic cylinder 7 with high-pressure fluid and thus extended the hydraulic cylinder 7. By this extension of the hydraulic cylinder 7, the point of application 11 of the hydraulic cylinder 7 acts on the front end 13 of the oblong hole 12 and thus moves the boom 5 upward. This movement can be caused by the control system H by the operator choosing the operating mode transport on the operator panel D. The movement can also be triggered by an operator on the driver stand 3 of the road making machine F actuating a special operational control 15, for example a push button 15, to temporarily lift the material deflector M during the operating mode laying and without changing this operating mode.

The operation of the road making machine F according to the invention is substantially facilitated in that the movement of the material deflector M is automatically effected by the operator choosing a certain operating mode of the road making machine F and/or actuating a special operational control 15. Thus, the cumbersome manual folding up of the material deflector M can be avoided.

FIG. 4 shows a second embodiment of a material deflector M. This second embodiment differs from the first embodiment in that a stop screw 20 is provided at the support T of the running gear R of the road finishing machine F. This stop screw 20 can be even more clearly seen in the completely raised position of the material deflector M which is shown in FIG. 5. The stop screw 20 cooperates with a corresponding counterstop at the boom 5 of the material deflector M and limits the pivoting travel of the boom 5 to the rear. The stop screw 20 can be optionally adjusted to change the pivot angle of the boom 5 of the material deflector M which can be covered to the rear.

It would be conceivable that in its neutral position, the material deflector M does not have free travel to the top and bottom, but that it only has free travel to the top (or to the bottom) to be able to evade obstacles.

The invention claimed is:

1. Road making machine with a running gear and at least one material deflector located in front of the running gear in the driving direction and which can be pivoted up and lowered, and comprising a control system by means of which an operator can choose at least between a laying operating mode and a transport operating mode and wherein the control system is adapted to automatically completely pivot the material deflector into the up position in the transport operating mode, and to let the operator adjust a pivot position of the material deflector manually in the laying operating mode.

2. Road making machine according to claim 1, wherein the material deflector can be pivoted up with respect to the horizontal about an angle (α) between about 30°-35°.

3. Road making machine according to claim 1 wherein the material deflector can be pivoted by means of a hydraulic system.

4. Road making machine according to claim 1, wherein the material deflector is retained with free travel permitting it to swivel to the top and/or to the bottom when it is not completely pivoted into the up position.

5. Road making machine according to claim 4, wherein a point of application of a hydraulic cylinder at the material deflector is retained in an oblong hole.

6. Road making machine according to claim 4, wherein a hydraulic cylinder takes a floating position to retain the material deflector with free travel.

7. Road making machine according to claim 1, wherein the material deflector is retained, when completely pivoted into the up position.

8. Road making machine according to claim 7 wherein a special operational control is provided that automatically causes the material deflector to pivot up into its completely raised position on actuation during the laying operating mode.

9. Road making machine according to claim 1, wherein the road making machine is a road finishing machine, an excavator or a feeder.

10. Method of operating a road making machine having a running gear and a material deflector located in front of the running gear in the driving direction and which can be pivoted up and lowered, which comprises: Using a control system to select between between a laying mode and a transport operating mode of the road making machine, Automatically pivoting, the material deflector up to its highest pivot position when the road making machine is in the operating mode transport, and that the operator manually adjusts a pivot position of the material deflector in the laying operating mode.

11. Method according to claim 10, wherein the material deflector is retained with free travel permitting it to pivot up and/or down, when it is not completely pivoted in the up position.

12. A road making machine comprising:
running gear,
at least one deflector positioned in front of the running gear and being adjustable to move between an up position and a down position,
a control system having a first laying operating mode and a second transport operating mode and including apparatus for automatically moving the material deflector into the up position when the control system is in the transport operating mode.

13. The road making machine of claim 12 wherein the control system includes apparatus for manually adjusting the position of the material deflector when the control system is in the laying operating mode.

14. The road making machine of claim 13 wherein the material deflector can be pivoted up at an angle of up to 30° with respect to the horizontal.

15. The road making machine of claim 13 wherein the material deflector can be pivoted up at an angle of 35° with respect to the horizontal.

* * * * *